United States Patent
Pütz et al.

(10) Patent No.: US 12,264,271 B2
(45) Date of Patent: Apr. 1, 2025

(54) PRESSURE-SENSITIVE ADHESIVE

(71) Applicant: tesa SE, Norderstedt (DE)

(72) Inventors: Benjamin Pütz, Neuss (DE); Sarah Zimmermann, Elmshorn (DE)

(73) Assignee: tesa SE, Norderstedt (DE)

( * ) Notice: Subject to any disclaimer, the term of this patent is extended or adjusted under 35 U.S.C. 154(b) by 740 days.

(21) Appl. No.: 16/812,950

(22) Filed: Mar. 9, 2020

(65) Prior Publication Data

US 2020/0291270 A1    Sep. 17, 2020

(30) Foreign Application Priority Data

Mar. 11, 2019    (DE) .............. 10 2019 203 286.9

(51) Int. Cl.
| | | |
|---|---|---|
| C09J 7/38 | (2018.01) | |
| C08F 18/08 | (2006.01) | |
| C08F 220/06 | (2006.01) | |
| C08F 220/18 | (2006.01) | |
| C09J 123/02 | (2006.01) | |
| C09J 133/08 | (2006.01) | |
| C09J 169/00 | (2006.01) | |
| C09J 193/04 | (2006.01) | |

(52) U.S. Cl.
CPC .............. *C09J 7/385* (2018.01); *C08F 18/08* (2013.01); *C08F 220/06* (2013.01); *C08F 220/1804* (2020.02); *C09J 123/02* (2013.01); *C09J 133/08* (2013.01); *C09J 169/00* (2013.01); *C09J 193/04* (2013.01); *C09J 2301/302* (2020.08)

(58) Field of Classification Search
CPC ........ C09J 7/385; C09J 133/08; C09J 133/10; C09J 133/12; C09J 2301/302; C08F 220/06

See application file for complete search history.

(56) References Cited

U.S. PATENT DOCUMENTS

| | | |
|---|---|---|
| 10,196,549 B2 | 2/2019 | Papenbroock et al. |
| 2003/0068945 A1 | 4/2003 | Samson-Himmelstjerna |
| 2005/0115664 A1 | 6/2005 | Musahl et al. |
| 2006/0231192 A1 | 10/2006 | Wahlers-Schmidlin et al. |
| 2016/0304754 A1* | 10/2016 | Papenbroock ....... C09J 151/003 |
| 2016/0304755 A1 | 10/2016 | Papenbroock |

FOREIGN PATENT DOCUMENTS

| | | |
|---|---|---|
| DE | 102 29 527 A1 | 1/2004 |
| DE | 10 2013 224 772 A1 | 6/2015 |
| DE | 10 2013 224 773 A1 | 6/2015 |
| EP | 1 300 452 A2 | 4/2003 |
| EP | 1 312 097 A1 | 5/2003 |
| EP | 1 580 245 A1 | 9/2005 |
| JP | 2008-260825 A1 | 10/2008 |
| WO | 02/11155 A1 | 2/2002 |
| WO | 2006/108871 A1 | 10/2006 |
| WO | 2010/002557 A1 | 1/2010 |

OTHER PUBLICATIONS

Search Report dated Jul. 15, 2020, in connection with European Patent Application No. EP 18715707.8.

* cited by examiner

*Primary Examiner* — Ling Siu Choi
*Assistant Examiner* — David L Miller
(74) *Attorney, Agent, or Firm* — Norris McLaughlin, P.A.

(57) ABSTRACT

Pressure-sensitive adhesives, adhesive tapes, and methods enable high bond strengths on non-polar or rough substrates. The pressure-sensitive adhesives and methods comprise (a) at least one poly(meth)acrylate, (b) at least one resin A selected from colophony resins and terpene-phenolic resins, (c) at least one hydrocarbon resin B1 having a softening point of greater than 50° C., and (d) at least one hydrocarbon resin B2 having a softening point of less than or equal to 25° C. The adhesive tapes comprise one or more layers of the pressure-sensitive adhesives, and the methods may produce adhesive bonds on substrates with low surface energy and/or on substrates with a mean roughness of at least 5 μm.

10 Claims, No Drawings

PRESSURE-SENSITIVE ADHESIVE

The invention relates to the technical field of acrylate-based, pressure-sensitive adhesives, as are used diversely in the art for producing adhesive bonds. The invention more specifically proposes an acrylate-based, pressure-sensitive adhesive which comprises a specific combination of resins and is suitable especially for use on rough or low-energy surfaces.

Tackifiers are used in the art for very different fields of use. One development to have become commonplace in the field of adhesives as well is to admix the more or less tacky matrix materials with additions which raise the bonding power of the composition. Any such auxiliary, obviously, is to affect the other properties of the adhesive very little or, if so, then in a positive direction.

In the sector of pressure-sensitive adhesives (PSAs), of the kind used diversely in adhesive tapes, poly(meth)acrylates have proved to be base materials which can be employed very effectively. They display excellent qualities in relation, for example, to their resistance to light, weather and a range of chemicals, and also in terms of their intrinsic bonding power and their ageing and heat resistance. More, they can be used across a range of polar and even less polar substrates, for example on glass and steel, but also on polystyrene and polycarbonates. There is a fundamental interest in improving the bonding performance of poly(meth)acrylate-based compositions specifically on less polar or else rough substrates, in order to be able to profit from the numerous other positive qualities of these substances in adhesive bonds of these kinds too. In this context, there is also particular interest in onward developments of suitable tackifier resins.

WO 2010/002557 A1 describes an adhesive for use on materials with a low-energy surface. The adhesive comprises an acrylate copolymer, a bonding-power booster with high glass transition temperature and a bonding-power booster with low glass transition temperature, where both bonding-power boosters have a glass transition temperature higher than that of the acrylate copolymer.

EP 1 580 245 A1 discloses a pressure-sensitive adhesive which comprises an acrylate copolymer and tackifier resins, the raw material of the tackifier resins in each case comprising a natural product. There are at least four resins included, which differ in their molecular structure. The proportion of each resin in the adhesive is in each case 5 to 20 parts by weight, based on 100 parts by weight of the acrylate polymer.

JP 2008260825 A discloses a double-sided adhesive tape having an adhesive layer consisting of an acrylate composition, based on 4-hydroxybutyl (meth)acrylate and acrylic acid, and of a bonding power-boosting resin. The adhesive layer is applied on a nonwoven web.

It was an object of the present invention to provide a pressure-sensitive adhesive enabling high bonding strengths to be achieved in particular on non-polar or rough substrates. Achieving this object is based on the concept of providing poly(meth)acrylates with a specific combination of resins. A first and general subject of the invention is a pressure-sensitive adhesive which comprises a) at least one poly(meth)acrylate;
b) at least one resin A selected from colophony and terpene-phenolic resins;
c) at least one hydrocarbon resin B1 having a softening point of greater than 50° C.; and
d) at least one hydrocarbon resin B2 having a softening point of less than or equal to 25° C.

A pressure-sensitive adhesive or adhesive composition is understood in the invention, as is customary in the general usage, as a material which at least at room temperature is permanently tacky and also adhesive. A characteristic of a pressure-sensitive adhesive is that it can be applied by pressure to a substrate and remains adhering there, with no further definition of the pressure to be applied or the period of exposure to this pressure. In general, though in principle dependent on the precise nature of the pressure sensitive adhesive and also on the substrate, the temperature and the atmospheric humidity, the influence of a minimal pressure of short duration, which does not go beyond gentle contact for a brief moment, is enough to achieve the adhesion effect, while in other cases a longer-term period of exposure to a higher pressure may also be necessary.

Pressure-sensitive adhesives have particular, characteristic viscoelastic properties which result in the permanent tack and adhesiveness. A feature of these adhesives is that when they are mechanically deformed, there are processes of viscous flow and there is also development of elastic forces of recovery. The two processes have a certain relationship to one another in terms of their respective proportion, in dependence not only on the precise composition, the structure and the degree of crosslinking of the pressure-sensitive adhesive, but also on the rate and duration of the deformation, and on the temperature.

The proportional viscous flow is necessary for the achievement of adhesion. Only the viscous components, frequently brought about by macromolecules with relatively high mobility, permit effective wetting and effective flow onto the substrate where bonding is to take place. A high viscous flow component results in high tack (also referred to as surface stickiness) and hence often also in high adhesion. Highly crosslinked systems, crystalline polymers, or polymers with glasslike solidification lack flowable components and are in general devoid of tack or possess only little tack at least.

The proportional elastic forces of recovery are necessary for the achievement of cohesion. They are brought about, for example, by very long-chain macromolecules with a high degree of coiling, and also by physically or chemically crosslinked macromolecules, and they allow the transmission of the forces that act on an adhesive bond. As a result of these forces of recovery, an adhesive bond is able to withstand a long-term load acting on it, in the form of a sustained shearing load, for example, to a sufficient degree over a relatively long time period.

For more precise description and quantification of the extent of elastic and viscous components, and also of the relationship between the components, the variables of storage modulus (G') and loss modulus (G'') are employed, and can be determined by means of dynamic mechanical analysis (DMA). G' is a measure of the elastic component, G'' a measure of the viscous component, of a substance. Both variables are dependent on the deformation frequency and the temperature.

The variables can be determined using a rheometer. In that case, for example, the material under investigation is exposed in a plate/plate arrangement to a sinusoidally oscillating shear stress. In the case of instruments operating with shear stress control, the deformation is measured as a function of time, and the time offset of this deformation is measured relative to the introduction of the shear stress. This time offset is referred to as the phase angle $\delta$.

The storage modulus G' is defined as follows: $G'=(\tau/\gamma)\cdot\cos(\delta)$ ($\tau$=shear stress, $\gamma$=deformation, $\delta$=phase angle=phase shift between shear stress vector and deformation vector).

The definition of the loss modulus G" is as follows: G"=(τ/γ)·sin(δ) (τ=shear stress, γ=deformation, δ=phase angle=phase shift between shear stress vector and deformation vector).

A composition is considered in particular to be a pressure-sensitive adhesive, and is defined in particular as such for the purposes of the invention, when at 23° C., in the deformation frequency range from $10^0$ to $10^1$ rad/sec, both G' and G" are situated at least partly in the range from $10^3$ to $10^7$ Pa. "Partly" means that at least a section of the G' curve lies within the window subtended by the deformation frequency range from $10^0$ inclusive up to $10^1$ inclusive rad/sec (abscissa) and by the G' value range from $10^3$ inclusive to $10^7$ inclusive Pa (ordinate), and if at least a section of the G" curve is likewise situated within the corresponding window.

A "poly(meth)acrylate" is understood to be a polymer which is obtainable by radical polymerisation of acrylic and/or methacrylic monomers and also, optionally, further, copolymerizable monomers. More particularly a "poly(meth)acrylate" is a polymer whose monomer basis consists to an extent of at least 50 wt % of acrylic acid, methacrylic acid, acrylic esters and/or methacrylic esters, with acrylic esters and/or methacrylic esters being included at least fractionally, preferably to an extent of at least 30 wt %, based on the overall monomer basis of the polymer in question.

The poly(meth)acrylate of the pressure-sensitive adhesive of the invention may be a homopolymer or a copolymer; preferably it is a copolymer. The term "copolymer" embraces polymers which may originate from at least two different monomers, which in principle may be arranged in any desired way—for example, randomly, with local accumulation, blockwise, or in alternation.

The poly(meth)acrylate of the pressure-sensitive adhesive of the invention may have a linear, branched, radial or else grafted structure. In principle the pressure-sensitive adhesive of the invention may comprise one or more poly(meth)acrylates. Despite reference above or below only to "the poly(meth)acrylate" or the "poly(meth)acrylates", such reference in each case embraces both the case where the pressure-sensitive adhesive comprises only one poly(meth)acrylate and the case where the pressure-sensitive adhesive comprises two or more poly(meth)acrylates.

The weight-average molar mass of the poly(meth)acrylate—or of all poly(meth)acrylates in the case of two or more poly(meth)acrylates—in the pressure-sensitive adhesive is preferably 250 000 to 10 000 000 g/mol, more preferably 500 000 to 5 000 000 g/mol. The particulars of number-average or weight-average molar masses $M_n$ or $M_w$ in this specification relate to the determination, known per se, by gel permeation chromatography (GPC; see below).

The composition of the poly(meth)acrylate is preferably chosen such that it has a glass transition temperature (DSC; see below) of not more than 0° C., preferably of not more than −20° C., very preferably of not more than −40° C.

The glass transition temperature of copolymers may be selected, through the choice and quantitative composition of the components used, in such a way that a suitable glass transition point $T_g$ for the polymer is obtained in analogy to the Fox equation (T. G. Fox, Bull. Am. Phys. Soc. 1956, 1, 123) according to equation E1

$$\frac{1}{T_g} = \sum_n \frac{w_n}{T_{g,n}} \qquad (E1)$$

where n is the serial number of the monomers used, $w_n$ is the mass fraction of the respective monomer n (wt %) and $T_{g,n}$ is the respective glass transition temperature of the homopolymer of the respective monomers n in K.

Up to a defined upper limiting molar mass, glass transition temperatures of homopolymers may be dependent on the molar mass of the homopolymer; the reference to glass transition temperatures of homopolymers in this specification refers to those polymers whose molar masses are above this limiting molar mass—that is, in the constant glass transition temperature range. The determination of the $T_g$ is made after removal of the solvent, in the non-crosslinked state (in the absence of crosslinkers).

The equation E1 can also be used, by analogy, to determine and predict the glass transition temperature of polymer mixtures. In that case, where the mixtures in question are homogeneous:

n is the serial number of the polymers used, $w_n$ is the mass fraction of the respective polymer n (wt %) and $T_{g,n}$ is the respective glass transition temperature of the polymer n in K.

The monomers on which the poly(meth)acrylate of the pressure-sensitive adhesive of the invention is based conform preferably to the formula (I)

$$CH_2=C(R^1)(COOR^2) \qquad (I), \text{in which}$$

$R^1$ is a H atom or a methyl group and $R^2$ is a H atom or a linear or branched, saturated or unsaturated hydrocarbon radical having 1 to 30, more preferably having 4 to 18, C atoms.

Preferably at least one of the parent monomers of the poly(meth)acrylate is selected from monomers whose homopolymer has a glass transition temperature $T_g$ of not more than 0° C., more preferably of −20° C. at maximum. With particular preference at least one monomer of the poly(meth)acrylate is selected from
  esters of acrylic acid with linear alcohols having up to 10 C atoms or with branched alcohols having at least 4 C atoms and
  esters of methacrylic acid with linear alcohols having 8 to 10 C atoms or with branched alcohols having at least 10 C atoms.

More particularly at least one of the parent monomers of the poly(meth)acrylate is selected from the group consisting of methyl acrylate, methyl methacrylate, ethyl acrylate, n-propyl acrylate, n-butyl acrylate, n-butyl methacrylate, n-pentyl acrylate, n-hexyl acrylate, n-heptyl acrylate, n-octyl acrylate, n-octyl methacrylate, n-nonyl acrylate, n-nonyl methacrylate, n-decyl acrylate, n-decyl methacrylate, isobutyl acrylate, isopentyl acrylate, isooctyl acrylate, isooctyl methacrylate, 2-ethylhexyl acrylate, 2-ethylhexyl methacrylate and 2-propylheptyl acrylate. Further parent monomers of the poly(meth)acrylate of the pressure-sensitive adhesive of the invention may have a tendency to form semicrystalline regions within the polymer. Monomers of this kind are selected more particularly from esters of (meth)acrylic acid with linear alcohols having at least 12, more preferably having at least 14, C atoms. Particularly preferred such monomers are stearyl acrylate and stearyl methacrylate.

Further parent monomers of the poly(meth)acrylate of the pressure-sensitive adhesive of the invention may advantageously be monofunctional acrylates and/or methacrylates of bridged cycloalkyl alcohols having at least 6 C atoms in the cycloalkyl alcohol residue. The cycloalkyl alcohols may also contain substitution, by $C_1$ to $C_6$ alkyl groups, halogen atoms or cyano groups, for example. Specific examples are cyclohexyl methacrylates, isobornyl acrylate, isobornyl methacrylate and 3,5-dimethyladamantyl acrylate.

For variation of the glass transition temperature it is also possible for the parent monomers of the poly(meth)acrylate of the pressure-sensitive adhesive of the invention to include comonomers whose homopolymers possess a high static glass transition temperature. Monomers of this kind are preferably aromatic vinyl compounds, styrene for example, wherein the aromatic ring systems preferably comprise $C_4$ to $C_{18}$ building blocks and may also contain heteroatoms. Particularly preferred examples are 4-vinylpyridine, N-vinylphthalimide, methylstyrene, 3,4-dimethoxystyrene, 4-vinylbenzoic acid, benzyl acrylate, benzyl methacrylate, phenyl acrylate, phenyl methacrylate, tert-butylphenyl acrylate, tert-butylphenyl methacrylate, 4-biphenylyl acrylate and methacrylate, and 2-naphthyl acrylate and methacrylate.

Further comonomers forming a basis for the poly(meth)acrylate of the pressure-sensitive adhesive of the invention up to a fraction of 40 wt % may in principle be all compounds that are compatible with the acrylates and have copolymerizable double bonds, such as vinyl compounds, for instance. Such vinyl compounds are preferably selected from the group consisting of vinyl esters, vinyl ethers, vinyl halides, vinylidene halides and also vinyl compounds having aromatic rings and heterocycles, especially in α-position to the double bond. Particularly preferred comonomers in this sense are selected from the group consisting of vinyl acetate, vinyl formamide, vinyl pyridine, ethyl vinyl ether, vinyl chloride, vinylidene chloride and acrylonitrile.

The parent monomers of the poly(meth)acrylate of the pressure-sensitive adhesive of the invention preferably comprise (meth)acrylates having functional groups which are able to react with crosslinkers. More preferably these (meth)acrylates contain acid groups, especially acrylic, sulfonic or phosphonic acid groups, or acid anhydride groups. Such monomers are with particular preference selected from the group consisting of acrylic acid, methacrylic acid, itaconic acid, maleic acid, fumaric acid, crotonic acid, aconitic acid, dimethylacrylic acid, β-acryloyloxypropionic acid, trichloroacrylic acid, vinylacetic acid, vinylphosphonic acid and maleic anhydride. With very particular preference the parent monomers of the poly(meth)acrylate of the pressure-sensitive adhesive of the invention comprise acrylic acid. Parent monomers of the poly(meth)acrylate of the pressure-sensitive adhesive of the invention that have functional groups able to react with crosslinkers are present in the poly(meth)acrylate more particularly in a fraction of 0.5 to 5 wt %, more preferably of 0.8 to 3 wt %, based on the total weight of the poly(meth)acrylate or of all of the parent monomers of the poly(meth)acrylate.

In one embodiment the poly(meth)acrylate is a copolymer derivable from a monomer composition comprising
  i) one or more alkyl acrylates having an alkyl radical comprising 1 to 4 carbons;
  ii) one or more alkyl acrylates having an alkyl radical comprising 5 or more carbons; and
  iii) acrylic acid.

The monomer composition preferably comprises acrylic acid at 0.5 to 5 wt %, based on the total weight of the monomer composition.

With particular preference the poly(meth)acrylate derives from the following monomer composition:

| | |
|---|---|
| n-Butyl acrylate | 40 to 75 wt %, especially 45 to 70 wt %; |
| 2-Ethylhexyl acrylate | 22 to 58 wt %, especially 27 to 53 wt %; |
| Acrylic acid | 0.5 to 4 wt %. |

The poly(meth)acrylates are prepared preferably by conventional radical polymerisations or controlled radical polymerisations. The poly(meth)acrylates may be prepared by copolymerisation of the monomers using customary polymerisation initiators and also, optionally, chain transfer agents, with polymerisation taking place at the customary temperatures in bulk, in emulsion, for example in water or liquid hydrocarbons, or in solution.

The poly(meth)acrylates are prepared preferably by copolymerisation of the monomers in solvents, more preferably in solvents having a boiling range of 50 to 150° C., especially of 60 to 120° C., using from 0.01 to 5 wt %, especially from 0.1 to 2 wt %, of polymerisation initiators, based in each case on the total weight of the monomers.

All customary initiators are suitable in principle. Examples of radical sources are peroxides, hydroperoxides and azo compounds, for example dibenzoyl peroxide, cumene hydroperoxide, cyclohexanone peroxide, di-tert-butyl peroxide, cyclohexylsulfonyl acetyl peroxide, diisopropyl percarbonate, tert-butyl peroctoate and benzopinacol. Preferred radical initiators are 2,2'-azobis(2-methylbutyronitrile) (Vazo® 67™ from DuPont) or 2,2'-azobis(2-methylpropionitrile) (2,2'-azobisisobutyronitrile; AIBN; Vazo® 64™ from DuPont).

Preferred solvents for preparing the poly(meth)acrylates are alcohols such as methanol, ethanol, n-propanol and isopropanol, n-butanol and isobutanol, especially isopropanol and/or isobutanol; hydrocarbons such as toluene and especially benzines with a boiling range from 60 to 120° C.; ketones, especially acetone, methyl ethyl ketone, methyl isobutyl ketone; esters such as ethyl acetate; and also mixtures of the aforementioned solvents. Particularly preferred solvents are mixtures which include isopropanol in amounts from 2 to 15 wt %, more particularly from 3 to 10 wt %, based in each case on the solvent mixture employed.

The poly(meth)acrylates of the pressure-sensitive adhesive of the invention are crosslinked preferably through linking reactions—especially in the sense of addition reactions or substitution reactions or else coordinative linking reactions—of functional groups they contain with specific compounds referred to as crosslinkers. The positions within the crosslinker molecules from which the macromolecules are attacked are also termed "reactive centres". Crosslinker molecules contain two or more reactive centres and are therefore capable of linking two or more macromolecules to one another. Occasionally here there are also unwanted secondary reactions, in which the reactive centres of one and the same crosslinker molecule react with only one macromolecule.

It is possible in principle to distinguish between two types of crosslinkers:
  1) Covalent crosslinkers, whose reactive centres attack the poly(meth)acrylate macromolecules covalently and therefore form a covalent bond between the reactive centre of the crosslinker and the position of the macromolecule that was attacked, especially a functional group of the macromolecule. All types of reaction are contemplated in principle for the formation of covalent bonds.
  2) Coordinative crosslinkers, whose reactive centres attack the poly(meth)acrylate macromolecules coordinatively and therefore form a coordinate bond between the reactive centre of the crosslinker and the position of the macromolecule that was attacked, especially a functional group of the macromolecule. All types of reaction in principle are contemplated for the formation of coordinate bonds.

In one embodiment the poly(meth)acrylate of the pressure-sensitive adhesive of the invention is crosslinked at least covalently with one or more crosslinkers selected from the group consisting of glycidyl amines, multifunctional epoxides, multifunctional aziridines and multifunctional isocyanates. More preferably the poly(meth)acrylate of the pressure-sensitive adhesive of the invention is at least covalently crosslinked with one or more crosslinkers selected from the group consisting of N,N,N',N'-tretrakis(2,3-epoxypropyl)cyclohexyl-1,3-dimethylamine, N,N,N',N'-tetrakis(2,3-epoxypropyl)-m-xylyl-α,α'-diamine, (3,4-epoxycyclohexyl)methyl 3,4-epoxycyclohexylcarboxylate, trimethylolpropanetris(2-methyl-1-aziridine-propionate), tolylene diisocyanate (TDI), tolylene 2,4-diisocyanate dimer, naphthylene 1,5-diisocyanates (NDI), o-tolylene diisocyanates (TODI), diphenylmethane diisocyanates (MDI), triphenylmethane triisocyanates, tris(p-isocyanatophenyl) thiophosphate and polymethylene polyphenyl isocyanate.

In another embodiment the poly(meth)acrylate of the pressure-sensitive adhesive of the invention is at least coordinatively crosslinked with one more chelate crosslinkers, preferably with one or more multivalent chelate crosslinkers, especially multivalent metal chelates. "Multivalent metal chelates" are compounds in which a multivalent metal atom is bonded coordinatively to one or more organic compounds. The multivalent metal atom is preferably selected from the group consisting of Al(III), Zr(IV), Co(II), Cu(I), Cu(II), Fe(II), Fe(III), Ni(II), V(II), V(III), V(IV), V(V), Zn(II), In(III), Ca(II), Mg(II), Mn(II), Y(III), Ce(II), Ce(IV), SOI), Ba(II), Mo(II), Mo(IV), Mo(VI), La(III), Sn(II), Sn(IV) and Ti(IV), more preferably from the group consisting of Al(III), Zr(IV) and Ti(IV).

The organic compounds bonded to the metal atom are preferably selected from the group consisting of alkyl esters, alcohols, carboxylic acids, ethers and ketones. With particular preference the poly(meth)acrylate of the pressure-sensitive adhesive of the invention is at least coordinatively crosslinked with one or more crosslinkers selected from the group consisting of titanium dipropoxide bis(acetylacetonate), titanium dibutoxide bis(octylene glycolate), titanium dipropoxide bis(ethylacetoacetate), titanium dipropoxide bis(lactate), titanium dipropoxide bis(triethanolaminate), titanium di-n-butoxide bis(triethanolaminate), titanium tri-n-butoxide monostearate, butyl titanate dimer, poly(titanium acetylacetonate), aluminium diisopropoxide monoethyl acetate, aluminium di-n-butoxide monomethyl acetoacetate, aluminium di-isobutoxide monomethyl acetoacetate, aluminium di-n-butoxide monoethyl acetoacetate, aluminium di-sec-butoxide monoethyl acetoacetate, aluminium triacetylacetonate, aluminium triethylacetoacetonate, aluminium monoacetylacetonate bis(ethylacetoacetonate) and zirconium tetraacetylacetonate.

The poly(meth)acrylates of the pressure-sensitive adhesive of the invention may be crosslinked with one or more covalent crosslinkers, with one or more coordinative crosslinkers or with a mixture of in each case one or more covalent and coordinative crosslinkers.

The pressure-sensitive adhesive of the invention preferably comprises covalent crosslinkers at in total 0.015 to 0.1 wt %, more preferably at in total 0.02 to 0.075 wt %, based in each case on the total weight of the poly(meth)acrylates.

The pressure-sensitive adhesive of the invention comprises at least one resin A selected from colophony resins and terpene-phenolic resins. In principle the pressure-sensitive adhesive may comprise one or more resins A; preferably it contains precisely one resin A selected from colophony resins and terpene-phenolic resins.

The term "colophony resins" encompasses both natural and modified rosin.

The pressure-sensitive adhesive of the invention preferably comprises one or more resins A in total at 15 to 30 wt %, based on the total weight of the pressure-sensitive adhesive. More preferably the pressure-sensitive adhesive of the invention contains exactly one resin A at 15 to 30 wt %, based on the total weight of the pressure-sensitive adhesive.

The at least one resin A is more preferably a terpene-phenolic resin.

The pressure-sensitive adhesive of the invention further comprises at least one hydrocarbon resin B1 having a softening point of greater than 50° C. and at least one hydrocarbon resin B2 having a softening point of less than or equal to 25° C. As it has emerged, acrylate-based pressure-sensitive adhesives which comprise the combination, as per the invention, of terpene-phenolic resin or colophony resin with two hydrocarbon resins of high and low softening point enjoy particularly good technical adhesive properties on substrates with low surface energy and on rough substrates.

In principle the pressure-sensitive adhesive may comprise in each case one or more hydrocarbon resins B1 and B2; preferably it contains exactly one hydrocarbon resin B1 and exactly one hydrocarbon resin B2.

The pressure-sensitive adhesive of the invention preferably comprises one or more hydrocarbon resins B1 at in total 10 to 25 wt %, based on the total weight of the pressure-sensitive adhesive. More preferably the pressure-sensitive adhesive of the invention contains exactly one hydrocarbon resin B1 at 12 to 20 wt/0, based on the total weight of the pressure-sensitive adhesive.

The pressure-sensitive adhesive of the invention preferably comprises one or more hydrocarbon resins B2 at in total 5 to 15 wt %, based on the total weight of the pressure-sensitive adhesive. More preferably the pressure-sensitive adhesive of the invention contains exactly one hydrocarbon resin B2 at 8 to 12 wt %, based on the total weight of the pressure-sensitive adhesive.

The pressure-sensitive adhesive of the invention may optionally comprise one or more additives selected from the group consisting of
  plasticizers, e.g. low molecular mass poly(meth)acrylates, phthalates, water-soluble plasticizers, phosphates and polyphosphates;
  functional additives, e.g. initiators and accelerators;
  electrically conductive materials, e.g. conjugated polymers, doped conjugated polymers, metal pigments, metal particles, metal salts, metal-coated particles, e.g. silver-coated beads, graphite, conductive carbon blacks, carbon fibres, ferromagnetic additives;
  foaming agents, expandants, expandable hollow spheres;
  low-flammability fillers, e.g. ammonium polyphosphate;
  compounding agents, nucleating agents;
  ageing inhibitors, e.g. primary and secondary antioxidants; light stabilizers, antiozonants;
  pulverulent and granular fillers, dyes and pigments, e.g. fibres, carbon blacks, zinc oxides, titanium dioxide, chalks, silicas, silicates, solid or hollow glass spheres, solid or hollow polymer spheres, solid or hollow ceramic spheres, microspheres made from other materials; and
  organic fillers.

A further subject of the invention is an adhesive tape which comprises a pressure-sensitive adhesive of the invention. The adhesive tape of the invention may be of single-sidedly or double-sidedly adhesive configuration—that is, it may be pressure-sensitively adhesively equipped only on one (external) side, or both sides.

At its most simple the adhesive tape of the invention consists of a layer of the pressure-sensitive adhesive of the invention; in that case it is what is called an adhesive transfer tape.

The adhesive tape of the invention preferably comprises a carrier layer, which may consist of any suitable material. Carrier materials for adhesive tapes are well known in the art.

The adhesive tape of the invention may be covered on one or both sides with a temporary lining material, which is removed prior to application. Lining materials of these kinds are commonly referred to as release liners and are likewise well known in the art.

A further subject of the invention is the use of a pressure-sensitive adhesive of the invention or of an adhesive tape of the invention for producing bonds on substrates with low surface energy and/or on substrates with a mean roughness of at least 5 µm, more particularly for producing adhesive bonds on substrates with low surface energy.

The adhesive products of the invention find a multiplicity of fields of application, as for example in the construction industry, in the electronics industry, in the home and hobby sector, in the auto industry, in ship, boat and railroad construction, for household appliances or for furniture. Examples of advantageous applications are the bonding of trim strips and badges in the aforesaid sectors, the bonding of stiffening profiles in elevators, the bonding of components and products in the solar industry, frame bonding in electronic consumer goods, such as televisions for example, and bonds associated with signage production.

The adhesive of the invention and the adhesive tapes of the invention are also outstandingly suitable for bonding flexible printing plates to curved surfaces. In the flexographic printing process, flexible printing plates are bonded to printing cylinders or printing sleeves. Such plates consist, for example, of a polyethylene terephthalate film (PET film) on which a layer of a photopolymer is applied, into which the appropriate print relief can be introduced by exposure to light. The bonding of the plates on the printing cylinder or printing sleeve then takes place by way of the PET film.

The adhesive tapes of the invention outstandingly meet the very exacting requirements in this area. For the printing operation, the pressure-sensitive adhesive tape is required to have a certain hardness, but also a certain elasticity. Moreover, the peel adhesion should be sufficient to ensure that the printing plate does not detach from the double-sided pressure-sensitive adhesive tape to be used here, or the pressure-sensitive adhesive tape from the cylinder or the sleeve. This is the case, for example, even at elevated temperatures of 40 to 60° C. and at relatively high printing speeds. In addition to this property, however, the PSA is also to possess reversible adhesion properties, in order to allow the printing plates to be detached again after the printing operations. Here, not only the adhesive bond of the pressure-sensitive adhesive tape to the print cylinder or print sleeve but also the bond to the plate must be amenable to residue-free parting, in order to ensure that both components can be reused. This detachability ought also to be the case after bonding over a relatively long time period (up to 6 months). It is desirable, moreover, that the pressure-sensitive adhesive tape and in particular the printing plate can be removed again without destruction thereof, i.e. without substantial application of force, since in general the printing plates are used more than once. Moreover, there should be no residues left on the printing plate and on the cylinder or sleeve. In summary, therefore, very exacting requirements are imposed on the double-sided pressure-sensitive adhesive tapes suitable for this utility, and these requirements are fulfilled outstandingly by the PSA of the invention.

The pressure-sensitive adhesive of the invention can also be used very effectively for bonding components of precision-mechanical, optical, electrical and/or electronic devices, such as during production, repair, decoration or the like of said devices, for example. Here it is possible for example for materials such as plastics, glasses, metals and the like to be bonded.

In particular, the pressure-sensitive adhesive and adhesive tapes of the invention are also suitable for the permanent adhesive bonding of flexible materials, in particular in the production of flexible displays. Such displays are becoming increasingly important.

Advantageously, the PSA can be used for the adhesive bonding of windows or lenses in casings of precision-mechanical, optical and/or electronic devices (so-called "lens mounting"). At least one of the rigid or flexible substrates here is transparent or translucent. The transparent or translucent substrate can be, for example, a window or an optical lens for the purpose of protecting sensitive components arranged therebeneath. Such components can be, for example, liquid-crystal displays (LCD), light-emitting diodes (LED) or organic light-emitting diodes (OLED) of displays, but also printed circuits or other sensitive electronic components. Important fields of use of such components are, for example, touch-sensitive displays or for bringing about optical effects for the functioning of the device—for example light refraction, light focusing, light attenuation or light amplification. With preference here the transparent substrate is so chosen that it has a haze value of not more than 50%, more preferably of not more than 10%, very preferably of not more than 5% (measured according to ASTM D 1003).

The second substrate is preferably likewise a component of a precision-mechanical, optical and/or electronic device, more preferably a casing or a mount for the windows or lenses as described above. With particular preference the transparent or translucent substrate is a substrate of glass, polymethyl methacrylate and/or polycarbonate.

In particular, the second substrate may consist of acrylonitrile-butadiene-styrene copolymers (ABS), polyamide or polycarbonate, which in particular can also be glass fibre reinforced; or of aluminium—especially including anodized aluminium—or of magnesium or of metal alloys.

It is also possible to add to the substrate materials additives, such as, for example, dyes, light stabilizers, ageing inhibitors, plasticizers or the like, provided that this is advantageous for the intended use; in the case of transparent or translucent materials in particular, only provided that it does not interfere with these optical properties or interferes with them only to an acceptable extent.

Electronic, optical and precision-mechanical devices within the meaning of this patent application are more particularly devices that are to be classified in class 9 of the international classification of goods and services for the registration of marks (Nice Classification); 10th edition (NCL(10-2013)), insofar as they are electronic, optical or precision-mechanical devices, and also timepieces and chronometric instruments according to class 14 (NCL(10-2013)), such as in particular scientific, nautical, surveying, photographic, cinematographic, optical, weighing, measuring, signalling, checking, life-saving and teaching apparatus and instruments;

apparatus and instruments for conducting, switching, transforming, accumulating, regulating and controlling electricity;

image recording, processing, transmission and reproduction devices, such as, for example, televisions and the like;

acoustic recording, processing, transmission and reproduction devices, such as, for example, radios and the like;

computers, calculators and data processing devices, mathematical devices and instruments, computer accessories, office equipment such as, for example, printers, fax machines, copiers, word processors, data storage devices;

remote communication devices and multifunctional devices with a remote communication function, such as, for example, telephones and answering machines;

chemical and physical measuring devices, control devices and instruments, such as, for example, battery chargers, multimeters, lamps, tachometers;

nautical devices and instruments;

optical devices and instruments;

medical devices and instruments and those for athletes;

timepieces and chronometers;

solar cell modules, such as, for example, electrochemical dye-sensitized solar cells, organic solar cells, thin-film cells; and fire-extinguishing devices.

Technical development is increasingly being directed at such devices, which are being made increasingly smaller and lighter so that their owners are able to take them with them at any time. This is conventionally effected by achieving lower weights and/or a suitable size for such devices. Within the scope of this specification, such devices are also referred to as mobile devices or portable devices. As part of this development trend, precision-mechanical and optical devices are increasingly (also) being provided with electronic components, which increases the possibilities for minimization. Because mobile devices are carried, they are exposed on an increased basis to mechanical stresses, for example by hitting edges, by being dropped, by contact with other hard objects in a bag, but also as a result of the permanent movement due to their being carried. However, mobile devices are also exposed to greater stresses due to the influence of moisture, temperature influences and the like than "immobile" devices, which are usually installed in interiors and are not moved or are scarcely moved. The pressure-sensitive adhesive of the invention has particularly preferably been found to withstand and to attenuate or compensate such disturbing influences. The PSA or adhesive tape of the invention are therefore used preferably for producing adhesive bonds in portable electronic devices.

Some portable devices are listed below, by way of example:

cameras, digital cameras; photographic accessories such as exposure meters, flashguns, diaphragms, camera casings, lenses; film cameras, video cameras;

microcomputers (portable computers, pocket computers, pocket calculators), laptops, notebook computers, netbooks, ultrabooks, tablet computers, handhelds, electronic diaries and organizers (so-called "electronic organizers" or "personal digital assistants", PDA, palmtops), modems;

computer accessories and operating units for electronic devices, such as mice, drawing pads, graphics tablets, microphones, loudspeakers, games consoles, gamepads, remote controls, remote operating devices, touchpads;

monitors, displays, screens, touch-sensitive screens (sensor screens, touchscreen devices), projectors;

reading devices for electronic books ("e-books");

mini TVs, pocket TVs, devices for playing films, video players;

radios (including mini and pocket radios), Walkmans, Discmans, music players for e.g. CD, DVD, Blu-ray, cassettes, USB, MP3; headphones;

cordless telephones, mobile telephones, smart phones, two-way radios, hands-free telephones, devices for summoning people (pagers, bleepers);

mobile defibrillators, blood sugar meters, blood pressure monitors, step counters, pulse meters;

torches, laser pointers;

mobile detectors, optical magnifiers, binoculars, night vision devices;

GPS devices, navigation devices, portable interface devices for satellite communication;

data storage devices (USB sticks, external hard drives, memory cards); and wristwatches, digital watches, pocket watches, fob watches, stopwatches.

Furthermore, PSAs and adhesive tapes of the invention are very suitable for jacketing elongate items such as, in particular, cable harnesses in motor vehicles, where the adhesive tape can be led in a helical line around the elongate item, or the elongate item can be axially sheathed by the tape. Here, with particular advantage, the adhesive tapes can be used in a jacket which consists of a covering where the adhesive tape is present in an edge region of the covering at least, the tape being bonded to the covering such that the adhesive tape extends over one of the longitudinal edges of the covering, and does so preferably in an edge region which is narrow in comparison to the width of the covering. A product of this type and also optimized embodiments thereof are disclosed in EP 1 312 097 A1. EP 1 300 452 A2, DE 102 29 527 A1, and WO 2006 108 871 A1 present further developments for which the adhesive tape of the invention is likewise especially suitable.

With further preference, the adhesive tape, when bonded to cables with PVC jacketing and to cables with polyolefin jacketing, does not destroy the same when an assembly made up of cables and adhesive tape is stored in accordance with LV 312 at temperatures above 100° C. for up to 3000 h and the cables are subsequently bent around a mandrel.

The adhesive tape of the invention is outstandingly suitable for wrapping cables, and can easily be unwrapped for ease of processing, and does not exhibit any or any substantial flagging nor any cable embrittlement even in the case of the high temperature classes T3 and T4 over 3000 h.

Pressure-sensitive adhesives of the invention, moreover, are used preferably to produce label bonds in vehicles, especially in cars.

EXAMPLES

Test Methods

Glass Transition Temperature ($T_g$):

The static glass transition temperature is determined by dynamic scanning calorimetry (DSC) in accordance with DIN EN ISO 11357-2. The values stated for the glass transition temperature $T_g$ are based on the glass transition temperature value $T_g$ according to DIN 53765:1994-03, unless otherwise indicated in a particular case.

Gel Permeation Chromatography (GPC):

The values stated for number-average and weight-average molecular weights $M_n$, $M_w$ and $M_z$ and also for the polydispersity PD in this specification are based on their determination by gel permeation chromatography.

The determination is made on 100 µL of a sample having undergone clarifying filtration (sample concentration 0.5 g/L). The eluent used is tetrahydrofuran with 0.1 vol % of trifluoroacetic acid. The measurement is made at 25° C. The pre-column used is a column of type PSS-SDV, 10 µm, ID 8.0 mm·50 mm. Separation takes place using columns of type PSS-SDV, 5 µm, $10^3$ Å (SN9090201) and also 5 µm, $10^2$ Å (SN9090200) each with ID 8.0 mm·300 mm (columns from Polymer Standards Service; detection by differential refractometer PSS-SECurity 1260 RID). The flow rate is 0.5 mL per minute. Calibration takes place against PMMA standards (polymethyl methacrylate calibration).

Softening Point:

The softening points were ascertained in a usual way in accordance with ASTM E28 (Ring-and-Ball).

Bonding Power:

The determination of the bonding power, as peel adhesion, took place under test conditions of 23° C.+/−1° C. temperature and 50%+/−5% relative humidity. The specimens of adhesive were cut to a width of 20 mm and adhered to a plate of the respective material indicated (PE, PP, steel, EPDM rough). The plates were cleaned and conditioned prior to measurement. For this the plates were first wiped down with solvent and then left to stand in the air for 10 minutes (steel/acetone) or two hours (PE, PP/ethanol; EPDM rough/isopropanol) to allow the solvent to evaporate. The side of the specimen facing away from the test substrate was then lined with an etched PET film 23 µm thick so as to prevent the specimen stretching during the measurement. After that, the test specimen was rolled onto the substrate. For this, the adhesive was rolled down five times back and forth using a 4 kg roller, with a rolling speed of 10 m/min. One minute ("initial") after the rolling procedure, the plate was inserted into a special mount which allowed the specimen to be peeled off at an angle of 180°. Peel adhesion was measured using a Zwick tensile testing machine, at a peel velocity of 300 mm/min. The results of the measurement are reported in N/cm as the mean from three separate measurements.

Raw Materials

Commercially Available Chemicals Used

| Chemical compound | Trade name | Manufacturer | CAS No. |
|---|---|---|---|
| Acrylic acid (AA) | | Sigma Aldrich | 79-10-7 |
| 2-Ethylhexyl acrylate (2-EHA) | | BASF | 103-11-7 |
| n-Butyl acrylate (n-BA) | | BASF | 141-32-2 |
| 2,2-Azobis(2-methylbutyronitrile) | Vazo ® 67 | Akzo Nobel | 13472-08-7 |
| Bis(4-tert-butylcyclohexyl) peroxydicarbonate | Perkadox ® 16 | Akzo Nobel | 15520-11-3 |
| N,N,N',N'-Tetrakis(2,3-epoxypropyl)cyclo-hexyl-1,3-dimethylamine | Syna Epoxy S-610 | Synasia | 65992-66-7 |
| Terpene-phenolic resin | Dertophene T | DRT | 25359-84-6 |
| Colophony resin | Foral 85-E (softening point 85° C.) | Eastman | 65997-13-9 |
| Hydrocarbon resin | Kristalex F85 Hydrocarbon Resin (softening point 86° C.) | Eastman | 9011-11-4 |
| Hydrocarbon resin | Dercolyte TS 105 (softening point 105° C.) | DRT | |
| Hydrocarbon resin | Wingtack 10 (softening point 10° C.) | CrayValley | 26813-14-9 |

Preparation of the Polyacrylates

A 300 L reactor conventional for radical polymerisations was filled with the amounts as specified in the examples of acrylic acid, 2-ethylhexyl acrylate (EHA) and n-butyl acrylate and also 72.4 kg of benzine/acetone (70:30). After nitrogen gas had been passed through the reactor for 45 minutes with stirring, the reactor was heated up to 58° C. and 50 g of Vazo® 67 were added. The jacket temperature was then set to 75° C. and the reaction was carried out constantly at this external temperature. After a reaction time of 1 h a further 50 g of Vazo® 67 were added. The reaction mixture was diluted after 3 h with 20 kg of benzine/acetone (70:30) and after 6 h with 10.0 kg of benzine/acetone (70:30). In order to reduce the residual initiators, one 0.15 kg portion of Perkadox® 16 was added after 5.5 h, and one after 7 h. The reaction was terminated after a reaction time of 24 h and the product was cooled to room temperature. The polymers obtained had weight-average molar masses $M_w$ in the range from 1 100 000 to 1 300 000 g/mol.

Lastly the crosslinker solution (syna epoxy S-610, 3 wt % in acetone; 0.05 part by weight of crosslinker per 100 parts by weight of polyacrylate) and also the resins in the amounts reported in Table 1 were added to the polymer solution. The adhesive thus produced was coated onto a siliconized release paper on a laboratory coating platform using a coating knife. The coatings were subsequently dried at 120° C. for 15 min.

The specimens were conditioned for 14 days under standard conditions (23° C., 50% relative humidity).

The adhesive compositions and the test results are contained in Tables 1 and 2.

TABLE 1

Composition of the pressure-sensitive adhesives

| | Polyacrylates (wt %) | | | TP resin | C resin | HC resin 1 | HC resin 2 | HC resin 3 |
|---|---|---|---|---|---|---|---|---|
| No. | n-BA | 2-EHA | AA | | | | | |
| 1 (C) | 49.5 | 49.5 | 1 | 20 | — | — | 15 | — |
| 2 (C) | 49.5 | 49.5 | 1 | — | 20 | 20 | 0 | — |
| 3 | 49.5 | 49.5 | 1 | 20 | — | — | 15 | 10 |
| 4 (C) | 49.5 | 49.5 | 1 | 25 | — | — | 15 | — |
| 5 (C) | 49.5 | 49.5 | 1 | — | — | — | 20 | — |
| 6 (C) | 49.5 | 49.5 | 1 | — | — | 25 | — | — |
| 7 (C) | 49.5 | 49.5 | 1 | — | — | 20 | 10 | — |
| 8 (C) | 49.5 | 49.5 | 1 | — | 30 | — | — | — |
| 9 (C) | 49.5 | 49.5 | 1 | — | 20 | 20 | — | — |
| 10 (C) | 49.5 | 49.5 | 1 | 20 | — | 20 | — | — |
| 11 | 49.5 | 49.5 | 1 | 20 | — | — | 20 | 5 |
| 12 | 49.5 | 49.5 | 1 | 30 | — | — | 15 | 5 |
| 13 | 49.5 | 49.5 | 1 | 15 | — | — | 15 | 15 |
| 14 (C) | 67 | 30 | 3 | — | 20 | 20 | — | — |
| 15 | 67 | 30 | 3 | — | 20 | 20 | — | 10 |
| 16 | 67 | 30 | 3 | 20 | — | — | 15 | 10 |
| 17 (C) | 67 | 30 | 3 | — | 30 | 20 | — | — |
| 18 | 67 | 30 | 3 | 25 | — | — | 10 | 10 |

TP resin—Terpene-phenolic resin (Dertophene T)
C resin—Colophony resin (Foral 85E)
HC resin 1—Hydrocarbon resin 1 (Kristalex F85)
HC resin 2—Hydrocarbon resin 2 (Dercolyte TS 105)
HC resin 3—Hydrocarbon resin 3 (Wingtack 10)
C—Comparative experiment (not inventive)

TABLE 2

Test results

| No. | Peel adhesion (N/cm), measured on . . . | | | EPDM rough (mean roughness 7.5 μm) |
|---|---|---|---|---|
| | PE | PP | Steel (ASTM) | |
| 1 (C) | 3.51 | 4.68 | 5.18 | 3.32 |
| 2 (C) | 3.32 | 6.07 | 5.74 | 3.78 |
| 3 | 5.93 | 9.71 | 6.78 | 6.32 |
| 4 (C) | 3.92 | 7.32 | 5.50 | 3.95 |
| 5 (C) | 2.59 | 5.06 | 4.92 | 3.58 |
| 6 (C) | 2.33 | 4.13 | 5.10 | 2.55 |
| 7 (C) | 3.17 | 5.78 | 5.63 | 3.63 |
| 8 (C) | 2.44 | 4.37 | 4.99 | 2.44 |
| 9 (C) | 3.52 | 6.07 | 5.27 | 3.28 |
| 10 (C) | 3.47 | 3.89 | 3.99 | 3.26 |
| 11 | 5.14 | 8.21 | 6.20 | 5.67 |
| 12 | 5.24 | 7.80 | 6.38 | 5.13 |
| 13 | 4.94 | 7.25 | 5.99 | 5.47 |
| 14 (C) | 3.52 | 8.76 | 6.01 | 3.11 |
| 15 | 6.05 | 9.50 | 6.22 | 6.85 |
| 16 | 5.23 | 8.88 | 6.15 | 6.69 |
| 17 (C) | 3.25 | 7.96 | 5.48 | 3.20 |
| 18 | 5.11 | 8.10 | 5.67 | 6.40 |

PE—Polyethylene
PP—Polypropylene
EPDM—Ethylene-Propylene-Diene copolymer

The invention claimed is:

1. A pressure-sensitive adhesive comprising:
   a) at least one poly(meth)acrylate;
   b) at least one resin A selected from colophony resins and terpene-phenolic resins;
   c) at least one hydrocarbon resin B1 having a softening point of greater than 50° C., determined according to ASTM E28 ring and ball; and
   d) at least one hydrocarbon resin B2 having a softening point of less than or equal to 25° C., determined according to ASTM E28 ring and ball,
   wherein the pressure-sensitive adhesive comprises the at least one resin A at a total concentration of 15 wt % to 30 wt %, based on a total weight of the pressure-sensitive adhesive,
   wherein the at least one poly(meth)acrylate is a copolymer derived from the following monomer composition consisting of:
   i) one or more alkyl acrylates having an alkyl radical comprising 1 to 4 carbons;
   ii) 2-ethylhexyl acrylate at a total concentration of 30 wt % to 58 wt %, based on a total weight of the monomer composition; and
   iii) acrylic acid.

2. The pressure-sensitive adhesive of claim 1, wherein the monomer composition comprises acrylic acid at 0.5 to 5 wt %, based on the total weight of the monomer composition.

3. The pressure-sensitive adhesive of claim 1, wherein the at least one resin A is a terpene-phenolic resin.

4. The pressure-sensitive adhesive of claim 1, wherein the pressure-sensitive adhesive comprises the at least one hydrocarbon resin B1 at a total concentration of 10 wt % to 25 wt %, based on the total weight of the pressure-sensitive adhesive.

5. The pressure-sensitive adhesive of claim 1, wherein the pressure-sensitive adhesive comprises the at least one hydrocarbon resin B2 at a total concentration of 5 wt % to 15 wt %, based on the total weight of the pressure-sensitive adhesive.

6. An adhesive tape comprising the pressure-sensitive adhesive of claim 1.

7. A method comprising at least one of:
   bonding a first substrate to a second substrate with the pressure-sensitive adhesive of claim 1; or
   adhesively bonding the adhesive tape of claim 6 to the first substrate and the second substrate,
   wherein at least one substrate has at least one of a low surface energy and a mean roughness of at least 5 μm, wherein the at least one substrate is at least one selected from the first substrate, and the second substrate.

8. The pressure-sensitive adhesive of claim 1, wherein the 2-ethylhexyl acrylate is present at a total concentration of 30 wt % to 49.5 wt %, based on the total weight of the monomer composition.

9. The pressure-sensitive adhesive of claim 1, wherein the monomer composition consists of:
   n-butyl acrylate;
   the 2-ethylhexyl acrylate; and
   the acrylic acid.

10. The pressure-sensitive adhesive of claim 9, wherein all poly(meth)acrylate(s) of the at least one poly(meth)acrylate has a weight-average molar mass of 500,000 to 5,000,000 g/mol.

* * * * *